(12) United States Patent
Bao (10) Patent No.: US 11,580,742 B2
(45) Date of Patent: Feb. 14, 2023

(54) TARGET CHARACTER VIDEO CLIP PLAYING METHOD, SYSTEM AND APPARATUS, AND STORAGE MEDIUM

(71) Applicant: SHENZHEN TCL NEW TECHNOLOGY CO., LTD., Shenzhen (CN)

(72) Inventor: Jian Bao, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 72 days.

(21) Appl. No.: 17/267,350

(22) PCT Filed: Dec. 27, 2019

(86) PCT No.: PCT/CN2019/128918
§ 371 (c)(1),
(2) Date: Feb. 9, 2021

(87) PCT Pub. No.: WO2020/135643
PCT Pub. Date: Jul. 2, 2020

(65) Prior Publication Data
US 2021/0271891 A1    Sep. 2, 2021

(30) Foreign Application Priority Data

Dec. 27, 2018 (CN) .......................... 201811615807.0

(51) Int. Cl.
*G06V 20/40* (2022.01)
*H04N 21/439* (2011.01)
(Continued)

(52) U.S. Cl.
CPC ......... *G06V 20/46* (2022.01); *H04N 21/4394* (2013.01); *H04N 21/44008* (2013.01); *H04N 21/8456* (2013.01)

(58) Field of Classification Search
None
See application file for complete search history.

(56) References Cited

U.S. PATENT DOCUMENTS

| 2014/0036152 A1* | 2/2014 | Jackson | ................. | H04N 21/47 |
| | | | | 348/E5.099 |
| 2015/0070587 A1 | 3/2015 | Emeott et al. | | |

(Continued)

FOREIGN PATENT DOCUMENTS

| CN | 104796781 A | 7/2015 |
| CN | 105100892 A | 11/2015 |

(Continued)

OTHER PUBLICATIONS

The Extended European Search Report dated Feb. 1, 2022 From the European Patent Office Re. Application No. EP19905673 0.

(Continued)

*Primary Examiner* — Alexander Q Huerta
(74) *Attorney, Agent, or Firm* — Nathan & Associates; Menachem Nathan (57) ABSTRACT

Provided are a target character video clip playing method, system and apparatus, and a storage medium. The method comprises: using image recognition technology to perform target character recognition on an entire video, positioning a plurality of video clips containing target characters, and obtaining a first playing time period set corresponding to the video clips; according to audio clips corresponding to each character marked within the entire video, obtaining a second playing time period set corresponding to the audio clips of the various characters; merging the time periods included in the playing time period sets, and obtaining a sum playing time period set of the target characters; according to a (Continued)

sorting of various playing timelines within the sum playing time period set, performing video playing of the target characters.

9 Claims, 4 Drawing Sheets

(51) Int. Cl.
  *H04N 21/44* (2011.01)
  *H04N 21/845* (2011.01)

(56) References Cited

U.S. PATENT DOCUMENTS

| | | | |
|---|---|---|---|
| 2015/0082349 A1 | 3/2015 | Ishtiaq et al. | |
| 2015/0110464 A1* | 4/2015 | Jackson | H04N 21/4882 386/230 |
| 2016/0247328 A1* | 8/2016 | Han | H04N 21/8549 |
| 2017/0025152 A1* | 1/2017 | Jaime | G11B 27/34 |
| 2017/0099512 A1* | 4/2017 | Osminer | H04N 21/8133 |
| 2018/0025078 A1* | 1/2018 | Quennesson | H04N 21/4788 725/141 |
| 2018/0301169 A1* | 10/2018 | Ricciardi | G11B 27/036 |
| 2020/0066305 A1* | 2/2020 | Spence | G11B 27/036 |
| 2020/0162799 A1* | 5/2020 | Merler | H04N 21/233 |

FOREIGN PATENT DOCUMENTS

| | | |
|---|---|---|
| CN | 106021496 A | 10/2016 |
| CN | 108271069 A | 7/2018 |
| CN | 108337532 A | 7/2018 |
| EP | 1067800 A1 | 1/2001 |
| WO | 2013173783 A1 | 11/2013 |

OTHER PUBLICATIONS

The World Intellectual Property Organization (WIPO) International Search Report for PCT/CN2019/128918 dated Mar. 27, 2020 7 Pages (including translation).

* cited by examiner

FIG. 4

TARGET CHARACTER VIDEO CLIP PLAYING METHOD, SYSTEM AND APPARATUS, AND STORAGE MEDIUM

CROSS-REFERENCES TO RELATED APPLICATIONS

This application is a national stage application of PCT Patent Application No. PCT/CN2019/128918, filed on Dec. 27, 2019, which claims priority to Chinese Patent Application No. 201811615807.0, filed on Dec. 27, 2018, the content of all of which is incorporated herein by reference.

FIELD OF THE INVENTION

The present disclosure relates to the technical field of video playing, and, more particularly, to a target character video clip playing method, a system, an apparatus, and a storage medium.

BACKGROUND

When a user is watching a TV drama, if a plot is tediously long, the user may skip some parts of the plot during watching, and there is a way to pick a video on demand by selecting to watch a clip having a character that one likes, and skip a plurality of other clips without the character. However, an AI (artificial intelligence) image recognition technology in the prior art can only recognize a character having a frontal image, also the image has to be clear, otherwise it will be impossible to make a recognition. However, in a TV drama, the character may be talking to a coupling character, while a shot may be constantly switching, that means, although the character is in the scene, since a front face of the character that the user likes to watch does not appear in the scene, the AI image recognition technology will judge that there is no target character in the scene, and skip automatically the scene having no front face of the character that the user likes to watch, while such a scene actually does contain the target character, thus it is impossible to obtain accurately a plot containing the target character based only on the AI image recognition technology.

Therefore, the current technology needs to be improved and developed.

BRIEF SUMMARY OF THE DISCLOSURE

According to the above described defects, the purpose of the present disclosure is providing a target character video clip playing method, a system, an apparatus, and a storage medium, in order to overcome the defect in the prior art that it is impossible to extract all of a plurality of playing clips containing the target character from an entire video by using an image recognition technology only.

A first embodiment provided by the present disclosure is a target character video clip playing method, wherein comprising:

using an image recognition technology to perform a target character recognition on an entire video, and positioning a plurality of video clips containing the target character, then obtaining a first playing time period set corresponding to the video clips;

obtaining a second playing time period set corresponding to a plurality of audio clips of each character, according to an audio clip marked corresponding to each character in the entire video;

combining a plurality of time periods contained in the first playing time period set and in the second playing time period set corresponding to an audio clip of the target character, and obtaining a sum playing time period set of the target character;

playing a video of the target character according to a sequence of each playing timeline in the sum playing time period set.

Recognizing the plurality of video clips containing the target character further comprises:

continuing detecting whether the target character is contained during a first preset time followed, when it is detected that a video picture is switched from having a target character to having no target character;

If no, ending positioning the present video clip, and recording a playing time period corresponding to the present video clip.

Recognizing the plurality of video clips containing the target character further comprises:

continuing detecting whether the target character is contained during a first preset time followed, when it is detected that a video picture is switched from having a target character to having no target character;

if no, ending positioning the present video clip, and recording a playing time period corresponding to the present video clip.

The method further comprises:

recognizing whether the target character is contained in the pictures during a second preset time period followed in each video clip and/or judging whether a voice feature of the target character is contained in an audio corresponding to a third preset time period followed in each audio clip;

if the target character and/or the voice feature of the target character is contained, then adding a corresponding playing time period in the second preset time period and/or the third preset time period to the sum playing time period set.

The method further comprises:

recognizing whether the target character is contained in the pictures during a second preset time period followed in each video clip and/or judging whether a voice feature of the target character is contained in an audio corresponding to a third preset time period followed in each audio clip;

if the target character and/or the voice feature of the target character is not contained, then skipping a playing time period followed corresponding to the second preset time period and the third preset time period;

The method further comprises:

according to the voice feature of each character, selecting a plurality of audio clips of the entire video to mark an audio of a character, and marking the character corresponding to each audio clip in the entire video according to the voice features having been marked.

Wherein, the target character comprises one specific character or a plurality of specific characters.

The step of combining the plurality of time periods contained in the first playing time period set and the second playing time period set corresponding to the audio clip of the target character, and obtaining the sum playing time period set of the target character comprises:

acquiring a playing timeline corresponding to the audio clip and a playing timeline corresponding to the audio clips contained in the first audio clip set;

deleting a part of the audio clips extracted overlapping with the playing timeline corresponding to the audio clips contained in the first audio clip set, then obtaining a first audio clip set having been merged.

A second embodiment provided by the present disclosure is a target character video clip playing system, wherein comprising:

a first audio set extraction module, applied to using an image recognition technology to perform a target character recognition on an entire video, and positioning a plurality of video clips containing the target character, then obtaining a first playing time period set corresponding to the video clips;

a second audio set acquisition module, applied to obtaining a second playing time period set corresponding to a plurality of audio clips of each character, according to an audio clip marked corresponding to each character in the entire video;

an audio matching module, applied to combining a plurality of time periods contained in the first playing time period set and in the second playing time period set corresponding to the audio clip of the target character, and obtaining a sum playing time period set of the target character;

a video playing module, applied to playing a video of the target character according to a sequence of each playing timeline in the sum playing time period set.

The first audio set extraction module further comprises:

a positioning detection unit, applied to continuing detecting whether the target character is contained during a first preset time followed, when it is detected that a video picture is switched from having a target character to having no target character; if no, ending positioning the present video clip, and recording a playing time period corresponding to the present video clip; if yes, continuing positioning the present video clip.

The system further comprises:

a delay detection module, applied to recognizing whether the target character is contained in the pictures during a second preset time period followed in each video clip and/or judging whether a voice feature of the target character is contained in an audio corresponding to a third preset time period followed in each audio clip;

and, if the target character and/or the voice feature of the target character is contained, then adding the corresponding playing time period in the second preset time period and/or the third preset time period to the sum playing time period set.

The delay detection module is further applied to recognizing whether the target character is contained in the pictures during a second preset time period followed in each video clip and/or judging whether a voice feature of the target character is contained in the audio corresponding to the third preset time period followed in each audio clip;

and, if the target character and/or the voice feature of the target character is not contained, then skipping the playing time period followed corresponding to the second preset time period and4 the third preset time period.

The second audio set acquisition module further comprises: a pre-marking unit;

the pre-marking unit, applied to selecting a plurality of audio clips of the entire video to mark an audio of the character according to a voice feature of each character, and marking the character corresponding to each audio clip in the entire video according to the voice features having been marked.

The target character comprises one specific character or a plurality of specific characters.

A third embodiment provided by the present disclosure is a target character video clip playing apparatus, wherein comprising: a memory and a processor, the memory has a computer program stored, wherein the processor runs the computer program and implements a plurality of steps in the method.

A fourth embodiment provided by the present disclosure is a storage medium, wherein the storage medium has a control program for switching a broadcast channel stored, and when the control program for switching the broadcast channel is executed by a processor, a plurality of steps of the target character video clip playing method are implemented.

Benefits: the present disclosure provides a target character video clip playing method, a system, an apparatus and a storage medium. By using an image recognition technology to perform a target character recognition on an entire video, and positioning a plurality of video clips containing the target character, then obtaining a first playing time period set corresponding to the video clips; obtaining a second playing time period set corresponding to a plurality of audio clips of each character, according to an audio clip marked corresponding to each character in the entire video; combining a plurality of time periods contained in the first playing time period set and in the second playing time period set corresponding to an audio clip of the target character, and obtaining a sum playing time period set of the target character; playing a video of the target character according to a sequence of each playing timeline in the sum playing time period set. The method provided by the present disclosure, combines the image recognition technology and a voiceprint matching, avoids a misjudgment to the target character video clip, thus improves a recognition accuracy, and provides a convenience for the users to watch the pictures containing the target character only.

DETAILED DESCRIPTION OF EMBODIMENTS

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described herein are used to explain the present disclosure only, instead of limiting the present disclosure.

In a plurality of implementations and a scope of the patent application, unless a plurality of special restrictions are applied herein on articles in the text, "a" and "the" may generally refer to a single or a plural.

In addition, if there are descriptions related to "first", "second", etc. in the embodiments of the present invention, the descriptions of the "first", "second", etc. are only used for descriptive purposes, instead of being understood as an instruction or an implication on a relative importance thereof or an implicit indication of a number of a plurality of technical features indicated. Therefore, the features defined with "first" and "second" may explicitly or implicitly include at least one of the features. In addition, the technical solutions between various embodiments can be combined with each other, however it must be based on what can be achieved by a person of ordinary skill in the art. When a combination of the technical solutions is contradictory or cannot be achieved, it should be considered that such a combination of the technical solutions does not exist, neither within the protection scope of the present invention.

Embodiment 1

Figure 1:
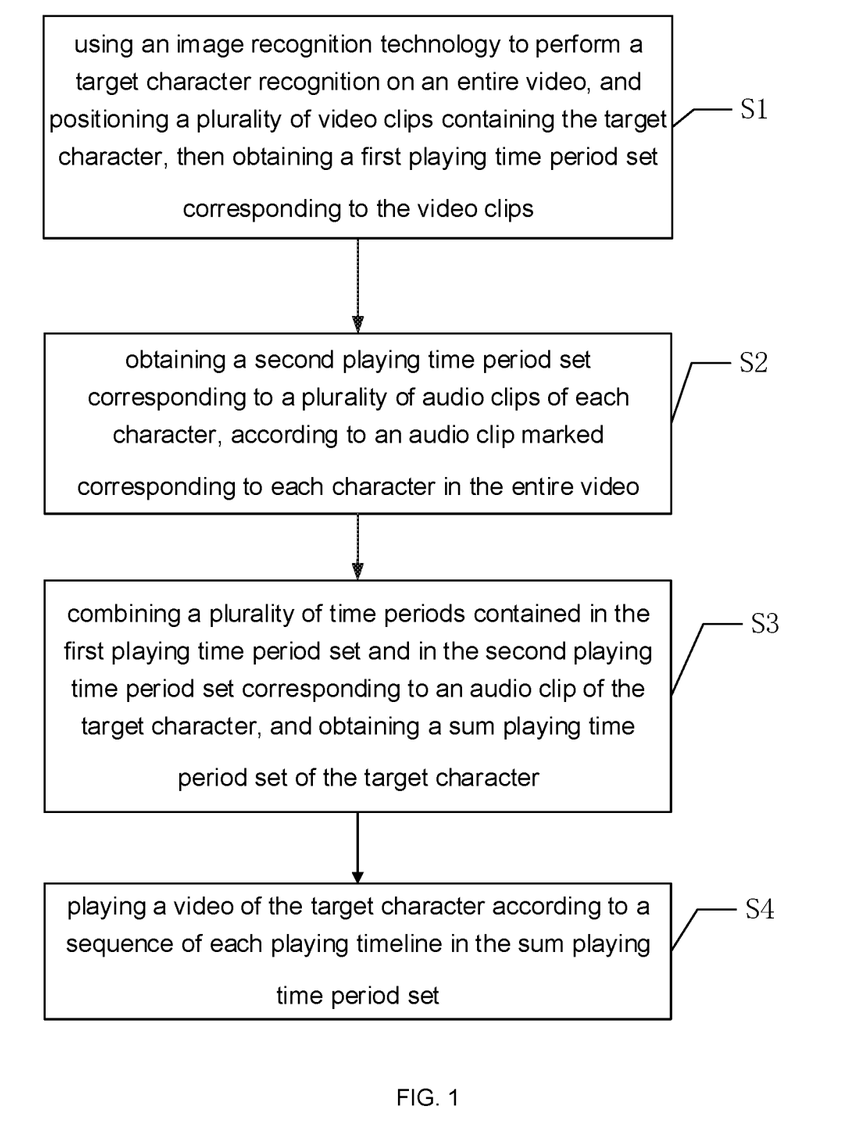
FIG. 1 illustrates a flow chart on the target character video clip playing method provided by the present disclosure.

A first embodiment provided by the present disclosure is a target character video clip playing method, shown as FIG. 1, comprising:

step S1: using an image recognition technology to perform a target character recognition on an entire video, and positioning a plurality of video clips containing a target character, then obtaining a first playing time period set corresponding to the video clips;

When a user selects a video and sends out an instruction that only watching the video clips having the target character specified in the video, first the image recognition technology is used to identify an entire image information of the video, and positioning the video clips containing the target character, as well as acquiring an audio file corresponding to the video clips according to a location information.

Specifically, the target character may comprise one specific character or a plurality of specific characters. The step of positioning the video clips starts positioning at an image frame where the target character is detected, and ends positioning at a playing time point when the target character is detected to be disappeared, so as to obtain a time period when the target character appears, and position a video clip. When recognizing the target character again, starting positioning and timing, and at a same time, acquiring a corresponding audio information to generate an audio file. Therefore, after an entire video is identified, a plurality of playing time period anchor points will be obtained, corresponding to the video clips in the entire video that the target character appears, as well as a plurality of audio clips corresponding to the video clips. All of the audio clips make up a first audio clip set.

Step S2, obtaining a second playing time period set corresponding to a plurality of audio clips of each character, according to an audio clip corresponding to each character in the entire video.

Since a voice feature of each character is different, such as a plurality of features including a timbre, a voiceprint and more, thus according to a difference in the voice feature of each character, mark the audio clips of the voice from each character in the entire video, and a second audio clip set containing the audio clip corresponding to each character will then be obtained.

Step S3, combining a plurality of time periods contained in the first playing time period set and in the second playing time period set corresponding to an audio clip of the target character, and obtaining a sum playing time period set of the target character.

Extract a plurality of audio clips related to the target character contained in the second audio clip set according to a voiceprint feature of the target character, and add the audio clips extracted to the first audio clip set.

In order to avoid missing to position a picture having a voice of the target character instead of showing the target character in the step S1, the step of combining the audio clips extracted to the first audio clip set in the present step comprises:

acquiring a playing timeline corresponding to the audio clip and a playing timeline corresponding to the audio clip contained in the first audio clip set;

deleting a part of the audio clips extracted overlapping with the playing timeline corresponding to the audio clips contained in the first audio clip set, then obtaining a first audio clip set having been merged.

That is, by integrating the playing time period corresponding to all of the audio clips containing the sound of the target character with the playing time period in the first audio clip set, the video clips containing both an image of the target character and the sound of the target character are obtained.

Step S4, playing a video of the target character according to a sequence of each playing timeline in the sum playing time period set.

The video is played according to the timeline corresponding to the audio clips contained in the first audio clip set having been integrated.

Specifically, in the step S1, in order to avoid that a positioned picture on a video scene is missing due to the target character leaving the picture for a short time, a step of recognizing the plurality of video clips containing the target character further comprises:

continuing detecting whether the target character is contained during a first preset time followed, when it is detected that a video picture is switched from having a target character to having no target character;

If no, ending positioning the present video clip, and recording a playing time period corresponding to the present video clip.

If yes, then continuing positioning the present video clip.

That is, when the target character is switched from presence to absence, the time is timed to determine whether the target character appears again within a first preset time. If it does not appear, then finish positioning the video clip and extracting the audio file. If it does appear, then continue positioning the video clip, without interrupting the extraction of the present audio clip.

In order to avoid a possible missing of an image frame between two video clips after combining positioning the target character and recognizing the voice feature, the method further comprises:

starting a timer to count a time of recognition or judgment, and at a same time, recognizing whether the target character is contained in the pictures during a second preset time period followed in each video clip and/or judging whether a voice feature of the target character is contained in an audio corresponding to a third preset time period followed in each audio clip;

if the target character and/or the voice feature of the target character is contained, then adding a corresponding playing time period in the second preset time period and/or the third preset time period to the sum playing time period set;

if it is not contained, then skip the playing time period followed corresponding to the second preset time period and the third preset time period followed.

That is, making a second check if a playing clip during a following time period in the video clip contains a picture or a voice of the target character or not, if there is a picture, then add a timeline according to a following video clip to a timeline of a video clip connected together; if there is no picture of the target character but an audio information of the target character, then add also an according timeline thereof to the timeline of the video clip; if there is neither picture nor voice of the target character, then skip the video clip according to the second preset time period following the present video clip.

In order to achieve an accurate marking to the audio information of each character in the entire video, it can be achieved by a manual marking method or an automatic matching of a voice feature. The method further comprises:

according to the voice feature of each character, selecting a plurality of audio clips of the entire video and marking an audio of the character, as well as marking the character corresponding to each audio clip in the entire video according to the voice features having been marked.

In the present step, it is possible to mark the audio clip of the target character by means of a manual marking method first, then make a full marking by an audio recognition apparatus to the audio clips of the target character in a whole according to a plurality of voice features contained in the audio clip having been marked manually.

Specifically, when recognizing the voice feature contained in the audio clips having been manually marked, it is possible to match the voice feature contained in the audio clips being marked manually with the audio signals contained in other audio clips in the video, when a matching degree exceeds 80%, it is determined as a match, and if it is less than 80%, it is considered as a mismatch.

Figure 3:
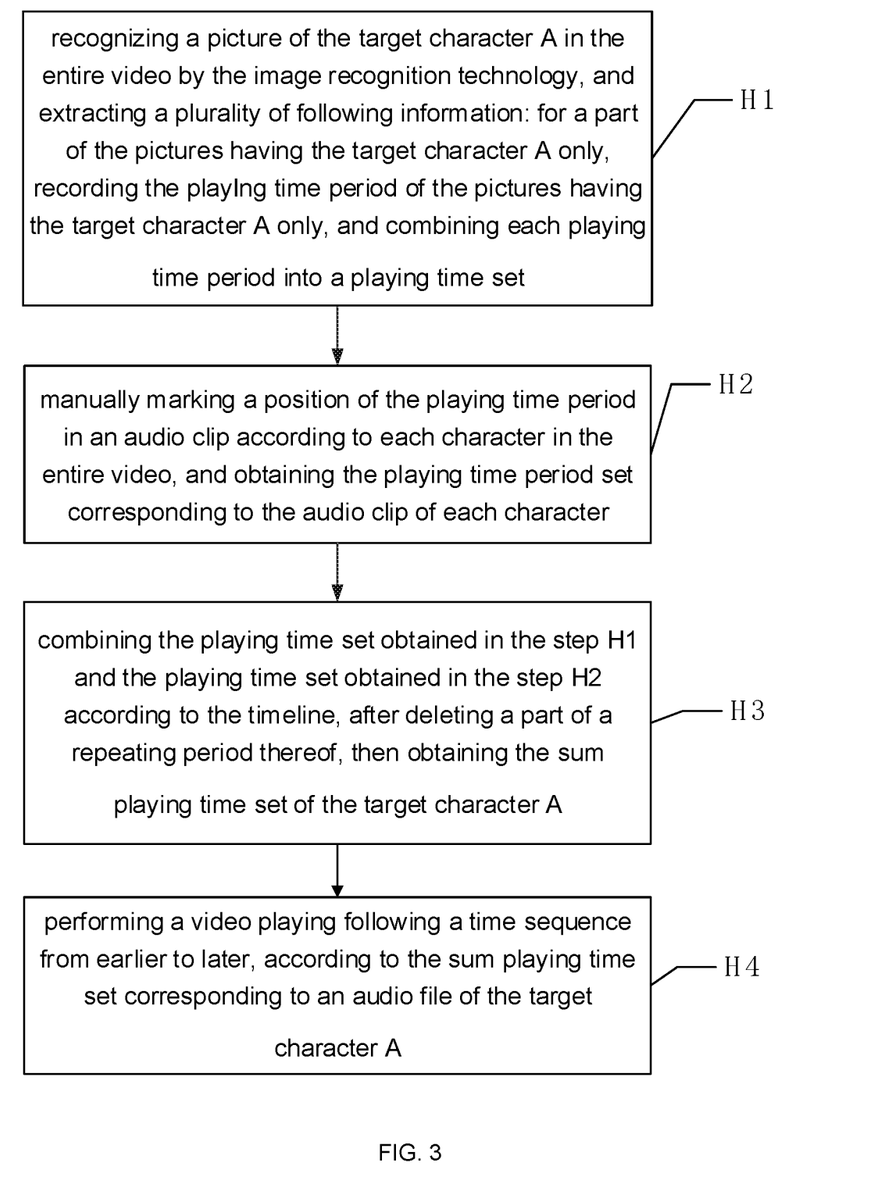
FIG. 3 illustrates a flow chart on an embodiment of the method provided by the present disclosure.

A further description to the method provided in the present disclosure is stated hereafter, combining with FIG. 3.

If there are a plurality of characters A, B, C and more in an entire video, and our current goal is providing a lite of the video containing a target character A only.

Step H1, recognizing a picture of the target character A in the entire video by the image recognition technology, and extracting a plurality of following information: for a part of the pictures having the target character A only, recording the playing time period of the pictures having the target character A only, and combining each playing time period into a playing time set. Preferably, an AI image recognition technology is chosen.

Step H2, manually marking a position of the playing time period in an audio clip according to each character in the entire video, and obtaining the playing time period set corresponding to the audio clip of each character;

Step H3, combining the playing time set obtained in the step H1 and the playing time set obtained in the step H2 according to the timeline, after deleting a part of a repeating period thereof, then obtaining the sum playing time set of the target character A.

Step H4, performing a video playing following a time sequence from earlier to later, according to the sum playing time set corresponding to an audio file of the target character A.

Figure 2:
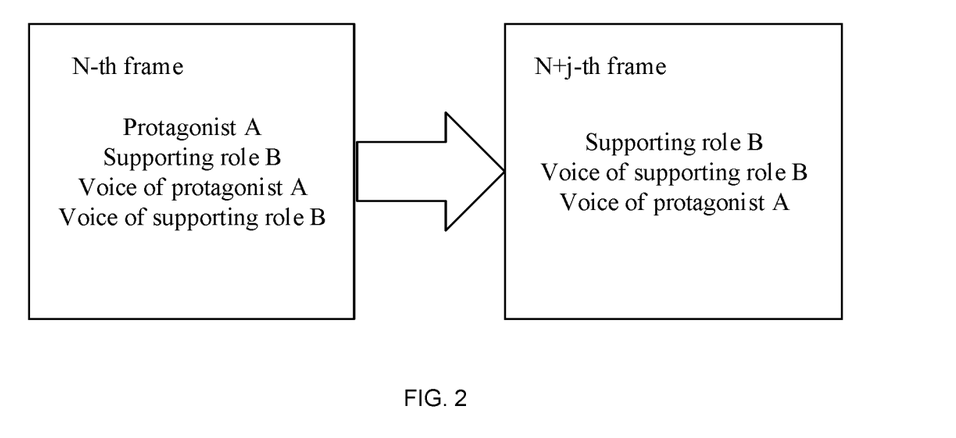
FIG. 2 illustrates a schematic diagram on a video scene switching in the method provided by the present disclosure.

In order to avoid losing a picture containing the target character A but neither being recognized in a scene nor containing a voice of the target character A, and causing the picture inconsistent, in an embodiment, it further comprises: recognizing whether there are pictures and/or voice of A in a next time period in the video clip, which will be described hereafter referencing to FIG. 2:

The user is choosing to watch the scene having the target character A only, for an N-th frame, there are: an image of a protagonist A, a voice of the protagonist A, an image of a supporting role B, a voice of the supporting role B. While in an N+j-th frame, the picture of the protagonist A is missing, there is a voice Y (may be A, but not sure), a picture of the supporting role B, a voice of the supporting role B. Extracting the voice Y, matching with a voice in AvoiceSet, and there is 80% of the voice feature within a threshold X, so the voice Y is considered to be generated by the protagonist A, thus for the N+j-th frame, although there is no pictures of A, we still consider a voiceprint of A exists, so A is considered existing, thus the N+J-h frame is kept.

Further, starting a timer $T_{max}$ at a same time, and from the N+j-th frame to time $T_{max}$, there is neither pictures of the protagonist A nor sounds of A received, A is considered having really left the picture, and from now on, cut off the picture, and restart to listen to a next sound of A or wait for a picture of A appears again.

Embodiment 2

Figure 4:
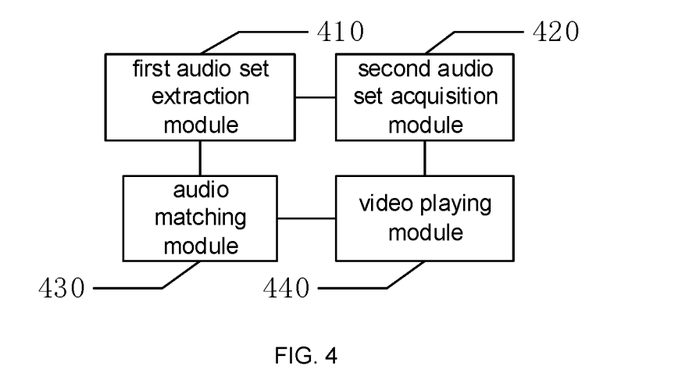
FIG. 4 illustrates a schematic diagram on a principle structure of the system provided by the present disclosure.

A second embodiment provided by the present disclosure is a target character video clip playing system, shown as FIG. 4, comprising:

a first audio set extraction module 410, applied to using an image recognition technology to perform a target character recognition on an entire video, and positioning a plurality of video clips containing the target character, then obtaining a first playing time period set corresponding to the video clips. A function thereof is described as the step S1.

A second audio set acquisition module 420, applied to obtaining a second playing time period set corresponding to a plurality of audio clips of each character, according to an audio clip marked corresponding to each character in the entire video. A function thereof is described as the step S2.

An audio matching module 430, applied to combining a plurality of time periods contained in the first playing time period set and in the second playing time period set corresponding to the audio clips of the target character, then obtaining a sum playing time period set of the target character. A function thereof is described as the step S3.

A video playing module 440, applied to playing a video of the target character according to a sequence of each playing timeline in the sum playing time period set. A function thereof is described as the step S4.

The first audio set extraction module 410 further comprises:

a positioning detection unit, applied to continuing detecting whether the target character is contained during a first preset time followed, when it is detected that a video picture is switched from having a target character to having no target character; if no, ending positioning the present video clip, and recording a playing time period corresponding to the present video clip; if yes, continuing positioning the present video clip.

Specifically, in order to avoid an image information missing in a positioned video clips, it further comprises:

a delay detection module, applied to recognizing whether the target character is contained in the pictures during a second preset time period followed in each video clip; if it is contained, then add the picture in the second preset time period into the video clips; if it is not contained, then match the voice feature contained in the voice file corresponding to the picture with the voice feature of the target character, if a similarity exceeds a preset threshold, then add the picture in the preset time period into the video clip.

Preferably, in order to realize an integrity of the picture containing the target character, the system further comprises:

a delay detection module, applied to recognizing whether the target character is contained in the pictures during a second preset time period followed in each video clip and/or judging whether a voice feature of the target character is contained in an audio corresponding to a third preset time period followed in each audio clip;

and, if the target character and/or the voice feature of the target character is contained, then adding a corresponding playing time period in the second preset time period and/or the third preset time period to the sum playing time period set;

if it is not contained, then skip a playing time period according to the second preset time period and/or the third preset time period followed.

Since a voice feature information of each character is already known, thus it is possible to mark the feature thereof in the audio file first, then the system will automatically mark all audio information similar to the target character in the audio clips corresponding to the entire video, according to the voice feature information being marked. Thus, the second audio set acquisition module further comprises: a pre-marking unit;

the pre-marking unit, applied to selecting a plurality of audio clips of the entire video to mark an audio of the character according to a voice feature of each character, and marking the character corresponding to each audio clip in the entire video according to the voice feature having been marked.

Embodiment 3

A third embodiment provided by the present disclosure is a target character video clip playing apparatus, comprising: a memory and a processor, the memory has a computer program stored, the processor runs the computer program to implement a plurality of steps in the method stated above.

The target character video clip playing apparatus may comprise at least one of following components: a processor, a memory, a power component, a multimedia component, an audio component, an input/output (I/O) interface, a sensor component, and a communication component.

The processor is usually applied to controlling a plurality of whole device operations of an apparatus, including a plurality of operations related to displaying, phone calling, digit communicating, camera operating and record operating. The processor may accomplish all or part of a plurality of steps in the methods stated above. In addition, the processor may comprise at least one module, to facilitate an interaction between the processor and a plurality of other components. For example, the processor may comprise a multimedia module, to facilitate an interaction between the multimedia component and the processor. The processor, in a plurality of embodiments, may be a CPU (Central Processing Unit), a microprocessor or a plurality of other data processing chips, applied to running a program code or a processing data stored in the memory, including executing the target character video clip playing method and more.

The memory is configured to store various kinds of data, in order to support a plurality of operations on the apparatus. A plurality of embodiments of the data comprise an instruction applied to operating a plurality of applications or methods on the apparatus, a contact person data, a phone address data, a message, a picture, a video and more. The memory may be implemented by any type of volatile or non-volatile storage device or a combination thereof, including a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

In a plurality of embodiments, the memory may be an internal storage unit of a playing apparatus, such as a hard disk or a memory in a smart TV. In a plurality of other embodiments, the memory may also be an external storage device in a playing apparatus, such as a plug-in hard disk equipped on the smart TV, a smart memory card (SMC), and a secure digital card (SD), a flash card, and more. Further, the memory may further comprise both the internal storage unit of the playing device and the external storage device. The memory is applied to storing an application software and a plurality of data installed in the playing apparatus, such as a program code to install the smart TV and more. The memory may also be applied to temporarily storing data that has been output or will be output. In one embodiment, the memory has a control program for the target character video clip playing stored, the control program based on the target character video clip playing is able to be executed by the processor, so as to implement the target character video clip playing methods in the present application.

The power component provides power to various components in the apparatus. The power component may comprise a power management system, at least one power source, and a plurality of other components related to generate, manage and distribute the power.

The multimedia component comprises a screen that provides an output interface between the apparatus and a user. In some embodiments, the screen may comprise a liquid crystal display (LCD) and a touch panel (TP). If the screen comprises the touch panel, the screen may be implemented as a touch screen, to receive a plurality of input signals from the user. The touch panel comprises at least one touch sensors to sense a touch, a sliding, and a gesture on the touch panel. The touch sensor may not only sense a boundary of an operation of touch or slide, but also detect a duration time and a pressure related to the operation of touch or slide. In some embodiments, the multimedia components comprise a front camera and/or a rear camera. When the apparatus is in an operating mode, such as a shooting mode or a video mode, the front camera and/or the rear camera may receive an external multimedia data. Each front camera and rear camera may be a fixed optical lens system or have a focal length and an optical zoom capability.

The audio component is configured to output and/or input an audio signal. For example, the audio component comprises a microphone (MIC), when the apparatus is in an operation mode, such as a call mode, a recording mode, and a voice recognition mode, the microphone is configured to receive an external audio signal. A received audio signal may be further stored in a memory or sent via a communication component. In some embodiments, the audio component further comprises a speaker, applied to outputting an audio signal.

The I/O interface provides an interface between a processing component and a plurality of peripheral interface modules. The peripheral interface modules mentioned above may be a keyboard, a click wheel, a button, and more. The buttons may comprise but not limited to: a homepage button, a volume button, a start button, and a lock button.

The sensor component comprises at least one sensor, applied to providing a plurality of status assessments of the apparatus on every aspect. For example, the sensor component may detect an on/off status of the apparatus and a relative position of the components. For example, the component is a display and a keypad of the apparatus. The sensor component may also detect a position change of the apparatus or a component of the apparatus, a presence or not of a contact between the user and the apparatus, an orientation of the apparatus or an acceleration/deceleration and a temperature change of the apparatus. The sensor component may comprise a proximity sensor, applied to detecting a presence of a nearby object without any physical contact. The sensor component can further comprise a light sensor, such as a CMOS or a CCD image sensor, applied to being used in a plurality of imaging applications. In some embodiments, the sensor component may further comprise an acceleration sensor, a gyroscope sensor, a magnetic sensor, a pressure sensor or a temperature sensor.

The communication component is configured to facilitate a wired or wireless communication between the apparatus and other devices. The apparatus may access a wireless network based on a communication standard, such as a WiFi, a 2G, or a 3G, or a combination thereof. In an exemplary embodiment, the communication component receives a broadcast signal or broadcast related information from an external broadcast management system via a broadcast channel. In an exemplary embodiment, the communication component further comprises a near field communication (NFC) module, to facilitate a short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the apparatus may be implemented by at least one of an application specific integrated circuits (ASIC), a digital signal processors (DSP), a digital signal processing device (DSPD), a programmable logic device (PLD), a field programmable gates Array (FPGA), a controller, a microcontroller, a microprocessor or a plurality of other electronic components, applied to executing the methods described above.

Embodiment 4

A fourth embodiment provided by the present disclosure is a storage medium, the storage medium has a control program for switching a broadcast channel stored, and when the control program for switching the broadcast channel is executed by a processor, a plurality of steps of the target character video clip playing method are implemented.

The storage medium may comprise a program storage area and a data storage area, wherein the program storage area may store an application program required by an operating system and at least one function; the data storage area may store data used or received by an industrial equipment management method and more. In addition, the storage medium may comprise a high-speed random access memory, and may also comprise a non-volatile memory, such as at least one magnetic disk storage device, a flash memory device, or other non-volatile solid state storage devices.

A plurality of computer apparatus mentioned above may execute the method provided in the embodiments of the present disclosure, having a plurality of corresponding functional modules for executing the method, and obtaining a plurality of corresponding beneficial effects. For a plurality of technical details not being described in details in the embodiment, it may be referred to the method provided by the embodiments of the present disclosure.

Benefits: the present disclosure provides a target character video clip playing method, a system, an apparatus and a storage medium. By using an image recognition technology to perform a target character recognition on an entire video, positioning a plurality of video clips containing the target character, then obtaining a first playing time period set corresponding to the video clips; obtaining a second playing time period set corresponding to a plurality of audio clips of each character, according to an audio clip marked corresponding to each character in the entire video; combining a plurality of time periods contained in the first playing time period set and in the second playing time period set corresponding to an audio clip of the target character, and obtaining a sum playing time period set of the target character; playing a video of the target character according to a sequence of each playing timeline in the sum playing time period set. The method provided by the present disclosure, combines the image recognition technology and a voiceprint matching, avoids a misjudgment to the target character video clip, thus improves a recognition accuracy, and provides a convenience for the user to watch the pictures containing the target character only.

Ordinary technical personnel in the art may understand that all or part of the processes in the embodiments on the method mentioned above, may be implemented by instructing a plurality of relevant hardware (such as a processor, a controller, and more) through a computer program. The program may be stored in a computer readable storage medium, the program may comprise the processes in the embodiments on the methods described above when being executed. Wherein the storage medium may be a memory, a magnetic disk, an optical disk, and more.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A target character video clip playing method, comprising:

using an image recognition technology to perform a target character recognition on an entire video of a video, and positioning a plurality of video clips containing the target character, then obtaining a first playing time period set corresponding to the video clips;

obtaining a second playing time period set corresponding to a plurality of audio clips of each character, according to an audio clip marked corresponding to each character in the entire video;

combining a plurality of time periods contained in the first playing time period set and in the second playing time period set corresponding to an audio clip of the target character, and obtaining a sum playing time period set of the target character;

playing a video of the target character according to a sequence of each playing timeline in the sum playing time period set, wherein a step of combining the plurality of time periods contained in the first playing time period set and the second playing time period set corresponding to the audio clip of the target character, and obtaining the sum playing time period set of the target character comprises:

acquiring a playing timeline corresponding to the audio clip and a playing timeline corresponding to the audio clips contained in a first audio clip set, the first audio clip set being made up of a plurality of audio clips corresponding to the positioned plurality of video clips;

deleting a part of the audio clips extracted overlapping with the playing timeline corresponding to the audio clips contained in the first audio clip set, then obtaining a first audio clip set having been merged.

2. The target character video clip playing method according to claim 1, wherein recognizing the plurality of video clips containing the target character further comprises:
continuing detecting whether the target character is contained in the video during a first preset time followed, when it is detected that a video picture is switched from having a target character to having no target character;
if the target character is contained in the video during the first preset time followed, continuing positioning the present video clip.

3. The target character video clip playing method according to claim 2, wherein the method further comprises:
according to the voice feature of each character, selecting a plurality of audio clips of the entire video to mark an audio of a character, and marking the character corresponding to each audio clip in the entire video according to the voice features having been marked.

4. The target character video clip playing method according to claim 1, wherein recognizing the plurality of video clips containing the target character further comprises:
continuing detecting whether the target character is contained in the video during a first preset time followed, when it is detected that a video picture is switched from having a target character to having no target character;
if the target character is not contained in the video during the first preset time followed, ending positioning the present video clip, and recording a playing time period corresponding to the present video clip.

5. The target character video clip playing method according to claim 1, wherein the method further comprises:
recognizing whether the target character is contained in the video during a second preset time period followed in each video clip and/or judging whether a voice feature of the target character is contained in an audio corresponding to a third preset time period followed in each audio clip;
if the target character and/or the voice feature of the target character is contained in the second preset time period or the third preset time period, then adding a corresponding playing time period in the second preset time period and/or the third preset time period to the sum playing time period set.

6. The target character video clip playing method according to claim 1, wherein the method further comprises:
recognizing whether the target character is contained in the video during a second preset time period followed in each video clip and/or judging whether a voice feature of the target character is contained in an audio corresponding to a third preset time period followed in each audio clip;
if the target character and/or the voice feature of the target character is not contained in the second preset time period or the third preset time period, then skipping a playing time period followed corresponding to the second preset time period and the third preset time period.

7. The target character video clip playing method according to claim 1, wherein the target character comprises one specific character or a plurality of specific characters.

8. A target character video clip playing apparatus, comprising: a memory and a processor, the memory has a computer program stored, wherein the processor runs the computer program and implements a target character video clip playing method, the target character video clip playing method comprising:
using an image recognition technology to perform a target character recognition on an entire video of a video, and positioning a plurality of video clips containing the target character, then obtaining a first playing time period set corresponding to the video clips;
obtaining a second playing time period set corresponding to a plurality of audio clips of each character, according to an audio clip marked corresponding to each character in the entire video;
combining a plurality of time periods contained in the first playing time period set and in the second playing time period set corresponding to an audio clip of the target character, and obtaining a sum playing time period set of the target character;
playing a video of the target character according to a sequence of each playing timeline in the sum playing time period set,
wherein a step of combining the plurality of time periods contained in the first playing time period set and the second playing time period set corresponding to the audio clip of the target character, and obtaining the sum playing time period set of the target character comprises:
acquiring a playing timeline corresponding to the audio clip and a playing timeline corresponding to the audio clips contained in a first audio clip set, the first audio clip set being made up of a plurality of audio clips corresponding to the positioned plurality of video clips;
deleting a part of the audio clips extracted overlapping with the playing timeline corresponding to the audio clips contained in the first audio clip set, then obtaining a first audio clip set having been merged.

9. A non-transitory storage medium, wherein the storage medium has a control program for switching a broadcast channel stored, and when the control program for switching the broadcast channel is executed by a processor, a plurality of steps, comprising:
using an image recognition technology to perform a target character recognition on an entire video of a video, and positioning a plurality of video clips containing the target character, then obtaining a first playing time period set corresponding to the video clips;
obtaining a second playing time period set corresponding to a plurality of audio clips of each character, according to an audio clip marked corresponding to each character in the entire video;
combining a plurality of time periods contained in the first playing time period set and in the second playing time period set corresponding to an audio clip of the target character, and obtaining a sum playing time period set of the target character;
playing a video of the target character according to a sequence of each playing timeline in the sum playing time period set,
wherein a step of combining the plurality of time periods contained in the first playing time period set and the second playing time period set corresponding to the audio clip of the target character, and obtaining the sum playing time period set of the target character comprises:
acquiring a playing timeline corresponding to the audio clip and a playing timeline corresponding to the audio clips contained in a first audio clip set, the first audio clip set being made up of a plurality of audio clips corresponding to the positioned plurality of video clips;

deleting a part of the audio clips extracted overlapping with the playing timeline corresponding to the audio clips contained in the first audio clip set, then obtaining a first audio clip set having been merged.

\* \* \* \* \*